United States Patent [19]
Du Bois et al.

[11] 3,908,111
[45] Sept. 23, 1975

[54] MULTIPLE PURPOSE COOKING APPLIANCE

[75] Inventors: Jean-Pierre Du Bois, Villa Park; Ralph Charles Stern, LaGrange Park, both of Ill.

[73] Assignee: Sunbeam Corporation, Chicago, Ill.

[22] Filed: July 3, 1974

[21] Appl. No.: 485,529

[52] U.S. Cl. .............. 219/442; 99/331; 219/432; 219/433
[51] Int. Cl.² ........................... E27D 11/02
[58] Field of Search ........ 219/415, 424, 425, 430, 219/429, 432, 433, 434, 435, 436, 437, 438, 439, 441, 442, 521; 99/331

[56] References Cited
UNITED STATES PATENTS

| | | | |
|---|---|---|---|
| 2,066,476 | 1/1937 | Lacy | 219/441 |
| 2,159,876 | 5/1939 | Lacy, Jr. | 219/441 |
| 2,164,813 | 7/1939 | Gunther | 219/436 |
| 2,235,911 | 3/1941 | Wilcox | 219/441 |
| 2,414,868 | 1/1947 | Gunther | 219/433 |
| 2,597,695 | 5/1952 | Braski et al. | 219/441 |
| 2,735,356 | 2/1956 | Sacks | 219/415 X |
| 2,785,277 | 3/1957 | Jepson | 219/442 |
| 3,089,943 | 5/1963 | Serio | 219/429 |
| 3,508,485 | 4/1970 | Munsey | 99/331 |
| 3,806,701 | 4/1974 | Scott | 219/438 |

*Primary Examiner*—Volodymyr Y. Mayewsky
*Attorney, Agent, or Firm*—George R. Clark; Neil M. Rose; John S. Pacocha

[57] ABSTRACT

An electric appliance having a deep well provided with an electric heating element and thermostatic control means for performing conventional cooking and deep frying and provided with a ceramic or glass vessel adapted to be inserted therein. The ceramic or glass vessel is dimensioned to be supported on a shoulder disposed on the upper edge of the vessel with the downwardly extending walls and bottom thereof spaced inwardly and upwardly from the walls and bottom of the enclosing metal vessel. The cover for the appliance is adapted to be supported on interior shoulders on either the ceramic vessel or the metallic vessel.

9 Claims, 3 Drawing Figures

US Patent    Sept. 23, 1975    3,908,111
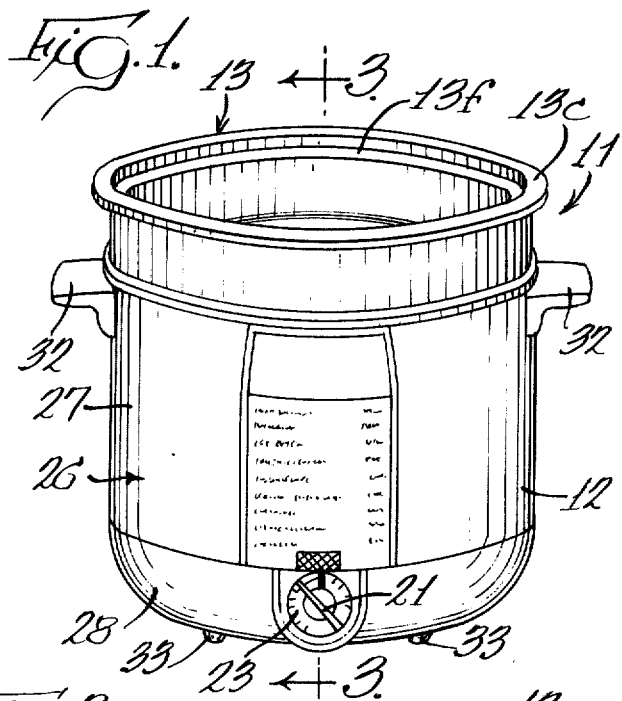
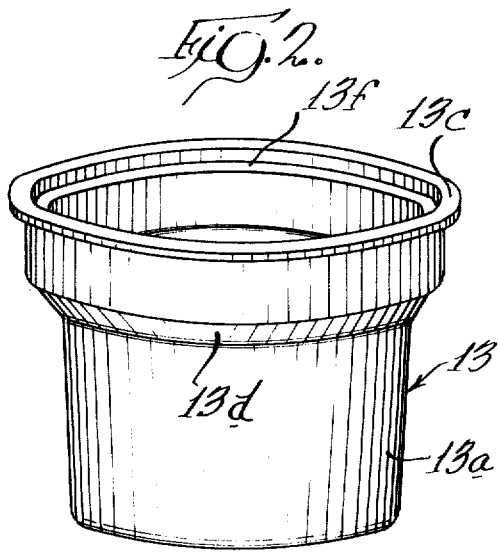
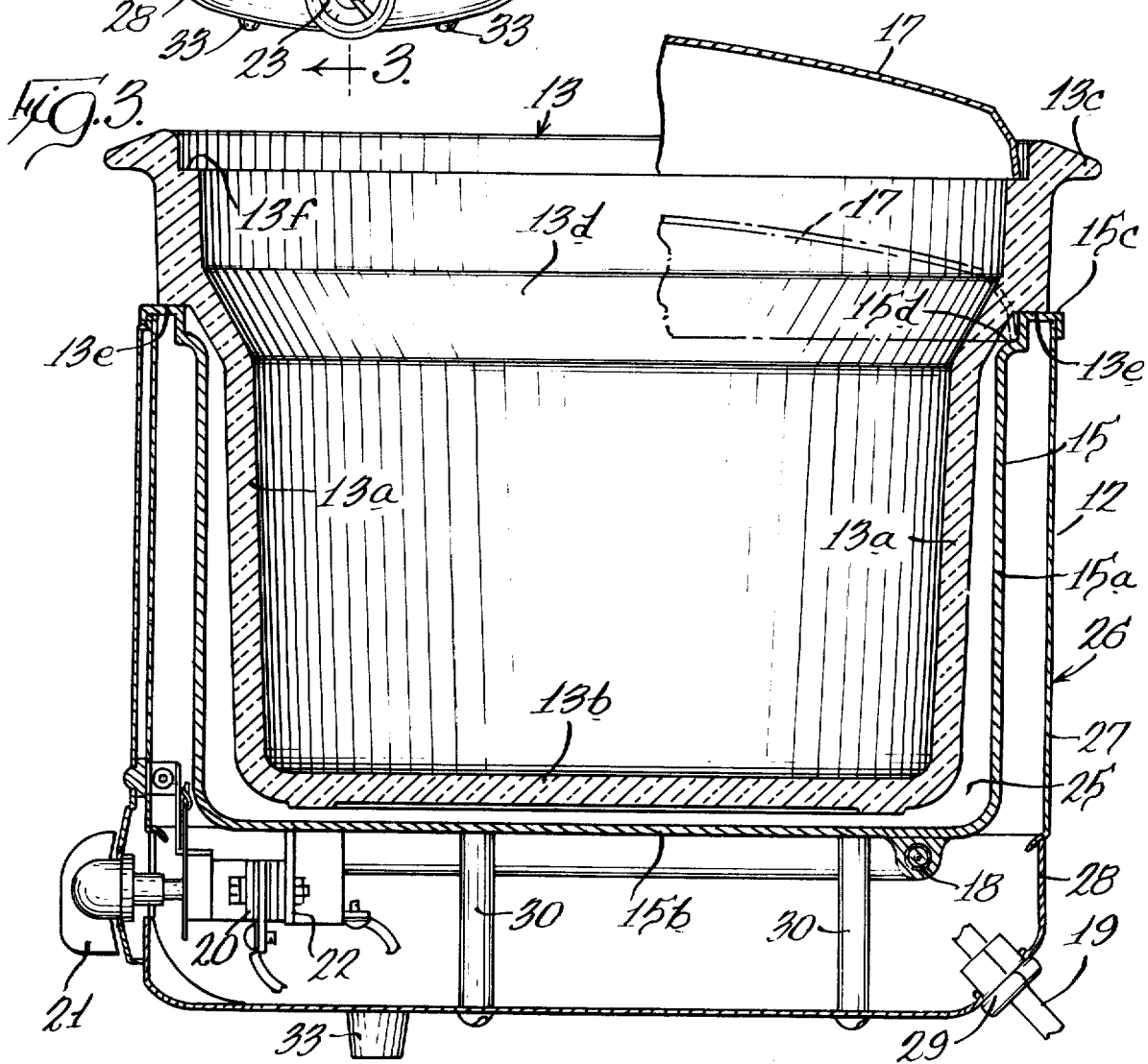

MULTIPLE PURPOSE COOKING APPLIANCE

BACKGROUND OF THE INVENTION

During the past 20 years, there has been substantial growth in the market for electric cooking appliances for performing functions such as frying, baking and the like. These appliances are in general characterized by having some type of thermostatic heating element mounted in good heat conducting relationship with the metallic vessel. Suitable thermostatic control means are provided to cycle the electric heating element in order to achieve the desired temperature in the cooking vessel.

More recently, there has been a recognition of the need for an electric cooking appliance which would have the capacity to cook foods at a relatively low temperature for a substantial period of time. This type of cooking is sometimes called simmering or slow cooking and involves maintaining the cooking vessel or receptacle at a temperature below the boiling point so that foods may be cooked for a period of 8 or 10 hours without driving off substantially all the moisture from the food being cooked. Many of the prior art appliances with their temperature control achieved by cycling on and off an electric heating element present difficulties in performing this slow cooking function. The cycling results in the temperature of the cooking vessel fluctuating over a range of perhaps 25°–50°F. The result is that it is impossible to maintain the food in the desired temperature below the boiling point without having the food intermittently cycled into the boiling range.

To overcome this problem, there has been marketed a slow cooker which utilizes a crockery vessel having two heating elements wound directly around the crockery vessel. Temperature control is accomplished by using a switch to place one element in the circuit to provide low wattage and low temperature or to place both elements in parallel in the circuit to provide high wattage and temperature. Because of the distributed arrangement of the heating element and the fact that it is a relatively low wattage element, it is possible to achieve relatively effective temperature control for slow cooking. Temperature control is limited because only two settings are available. Such an appliance is of limited function and is relatively costly when one considers the limited function. The patent to Hill, U.S. Pat. No. 643,898 discloses a ceramic vessel with a distributed heating element which is very similar to the approach followed in some of the present day slow cookers insofar as arrangement of the heating element on the crockery vessel is concerned.

Other art of interest with respect to slow cooking involves the deep well cooker utilized on some electric ranges or stoves. The patent to McCormick, U.S. Pat. No. 2,217,804 discloses a deep well cooker in connection with a stove having an inserted vessel which is received in a well on the stove. The heating element for the vessel is located at the bottom of the well. A similar type of deep well cooker is shown in Sacks U.S. Pat. No. 2,735,356 where in FIG. 5 there is shown a deep well within which a removable inner receptacle is received. Illustrative of cookers and deep fryers having removable vessels are Schwaneke U.S. Pat. No. 2,749,426 and Munsey U.S. Pat. No. 3,508,485. None of the above described arrangements would provide satisfactory slow cooking as well as the more conventional cooking and deep frying for which appliances of this type are conventionally used.

The patent to Gunther U.S. Pat. No. 2,164,813 could conceivably be well adapted to slow cooking, but the most satisfactory embodiments for performing the slow cooking would not be well adapted to deep frying and other conventional cooking tasks. Other prior art of less interest are Hojo U.S. Pat. No. 3,644,709; Rimmel U.S. Pat. No. 2,236,837 and Allan U.S. Pat. No. 1,098,806.

BRIEF DESCRIPTION OF THE INVENTION

The invention comprises a portable electric appliance having a primary cooking vessel heated by an electric heating element and having variable thermostatic control means to cycle the energization of the heating element to control the temperature of this primary vessel. Suitable housing and support means are provided for the primary vessel, the heating element and the thermostat. Included with the primary vessel is a secondary ceramic or glass vessel which is removably received in the primary vessel to adapt the appliance to slow cooking. The secondary vessel is formed near its upper edge with a peripheral shoulder which engages the upper edge of the primary vessel and supports the secondary vessel therein. The secondary vessel is dimensioned to have the bottom and interior walls thereof spaced from the bottom and walls of the primary cooking vessel. The portion of the secondary vessel extending upwardly from the peripheral support shoulder is formed with an upper lip having an internal shoulder adapted to receive the same cover as is designed to fit the mouth of the primary cooking vessel.

The resulting appliance is adapted to perform the conventional cooking and deep frying functions in the primary cooking vessel while the secondary vessel adapts the appliance to slow cooking at accurately regulated temperatures extending over a substantial period of time. The secondary vessel and the air space between the primary cooking vessel and the secondary vessel provide a thermal lag so that the temperature variations associated with the intermittent operation of the heating element on the primary vessel are leveled out so that the food in the crockery vessel may be maintained at a very even and selected temperature below the boiling point for slow cooking.

Accordingly, an object of the present invention is to provide an improved multi-purpose cooking appliance adapted for cooking, frying and slow cooking or simmering.

It is another object of the presesnt invention to provide an improved cooking appliance having a removable ceramic or glass insert which adapts the appliance to slow cooking or simmering with little temperature fluctuation.

Still another object of the present invention is to provide a deep well cooker having a primary cooking vessel made of a good heat conducting material and a secondary vessel insertable therein having its wall in spaced relationship to said primary cooking vessel.

Another object of the present invention is to provide an improved electric appliance having a deep well cooking vessel adapted to receive a secondary vessel for use in slow cooking.

A further object of the present invention is to provide a portable electric cooking appliance having a primary cooking vessel provided with a cover and a crockery insert for the primary cooking vessel which insert is supported in said primary vessel and adapted to be closed by the same cover as is usable with the primary cooking vessel.

Further objects and advantages will become apparent as the following description proceeds and the features of novelty which characterize the invention will be pointed out in the claims annexed to and forming a part of the specification.

DESCRIPTION OF THE DRAWINGS

FIG. 1 is a front perspective view of a multiple purpose cooking appliance embodying our invention;

FIG. 2 is a perspective view of the crockery insert which forms a part of the appliance shown in FIG. 1 but is shown removed from the appliance; and FIG. 3 is an enlarged sectional view taken in line 3—3 of FIG. 1.

DETAILED DESCRIPTION OF THE INVENTION

Referring to the drawings, there is shown in FIG. 1 a multiple purpose electric cooking appliance designated generally by reference numeral 11. The appliance 11 comprises an electric cooker 12 and a crockery vessel 13 which is inserted or received in the electric cooker 12.

The electric cooker 12 may be of the type disclosed and claimed in Jepson U.S. Pat. No. 2,785,277 which is assigned to the same assignee as the present invention. The cooker 12 is formed with an inner or primary cooking vessel 15 having circular side walls 15a, a bottom wall 15b and an outwardly extending flange 15c at the upper edge of the walls 15a. Located slightly inwardly of the flange 15c is an inwardly facing annular shoulder 15d which is adapted to receive a cover 17.

In order to heat the contents of the vessel 15, there is provided a heating element 18 secured to the bottom wall 15b of the vessel. The vessel 15 may be formed of a cast aluminum alloy or may be drawn from sheet aluminum. In the former case, the heating element 18 may be simply cast within the bottom wall 15b as is disclosed in the above-cited Jepson patent. Alternatively, the heating element may be a separate generally circular element which may be brazed or welded to the bottom wall of a drawn vessel 15.

To supply power to the heating element 18, there is provided a power cord 19 which is connected through a thermostat 20 to the element 18. The thermostat 20 is provided with a control knob 21 which permits manual adjustment of the thermostat to achieve the desired temperature range within the vessel 15 as the thermostat cycles on and off controlling the application of power to the element 18 in a conventional manner. The thermostat 20 is mounted in good heating transfer relationship to the bottom 15b of the vessel 15 by a support bracket 22. There is conventionally provided a temperature scale 23 mounted in cooperating relationship to the knob 21 as shown in FIG. 1 to permit selection of the desired temperature to which the cooking vessel 15 will be controlled. It should be understood, however, that with the type of thermostatic control provided, the temperature of the vessel will cycle above and below the desired or selected temperature as is explained in detail below.

The thermostat 20 is conventionally of a bimetallic type having contacts which are opened as the heating element 18 heats it and then closed as it cools. This results in a cycling of the temperature through a range of perhaps 25°–75°, this range being ideally centered on the temperature selected on the scale 23. The result of this fluctuating temperature is that the food is cooked at a rate which is sometimes a little faster and sometimes a little slower than the optimum temperature to which the cooking should occur. The amount of fluctuation will depend on many factors including the size and types of foods being cooked. However, the shortcomings involved in utilizing this fluctuating temperature for normal cooking chores is outweighed by the economics involved in making a cooking vessel control of this type. When cooking foods for periods of a few hours or less, the temperatures are such that the fluctuation presents little in the way of problems. If one is attempting to cook foods for a period of 5–8 hours at a temperature of on the order of 190°–200°F, the cycling operation of the thermostat 20 presents an unacceptable condition since the food is brought to a boil intermittently. This intermittent boiling causes the liquids in the food being slow cooked to boil away and ultimately burn. Alternatively, if the thermostat 20 is set low enough so that the peaks of the temperature fluctuation remain below the boiling temperature, the food will in all likelihood cook too slowly because the temperature will be below the optimum cooking temperature much of the time. This results in undesirable bacteria growth which causes food spoilage. It is apparent, therefore, that the electric cooker 12 with its cooking vessel 15 and thermostat 20 in inherently unsuited to slow cooking at low temperatures because of the temperature regulation problem. The fact remains, however, that the metal cooking vessel 15 with its integrally mounted heating element 18 and the thermostat 20 provides an inexpensive approach to fabricating an electric cooker which performs very satisfactory for most normal cooking tasks. The vessel may be heated up to a sufficient temperature to braze meat prior to cooking as is desirable with many types of roasts. It also performs well as a deep cooker or fryer and may even be used to bake cakes and the like.

In order to adapt the electric cooker 12 to slow cooking, there is provided a secondary vessel 13 which may be ceramic or crockery and which is generally similar in size and shape to the primary cooking vessel and is formed with cylindrical side walls 13a, a bottom wall 13b and an outwardly extending flange 13c extending from the upper edge of the side walls 13a. As an alternative construction, the vessel 13 may be made of glass rather than ceramic material. The side walls 13a are formed with an angled portion 13d in an area several inches from the mouth of the vessel 13. This angled portion 13d on the exterior of the vessel 13 forms a somewhat annular tapered portion which tends to center the crockery vessel 13 within the primary cooking vessel 15. On the outer wall of the crockery vessel 13 adjacent this angled portion 13d, there is provided an annular shoulder 13e which abuts against the flange 15c on the primary cooking vessel 15. This shoulder 13e forms the support for the vessel 13 with the shoulder 13e in engagement with the flange 15c. The vessel 13 is positioned within the primary cooking vessel 15 with the side walls of the two vessels and the bottom walls being spaced to provide an air space 25 which effectively insulates the crockery vessel from the primary cooking vessel 15.

The portion of the side walls 13a which extend above the angled portion 13d provides the crockery vessel 13 with additional volumetric capacity which in a sense compensates for the smaller size of the portion of the vessel 13 which lies within the vessel 15. As a consequence, the crockery vessel 13 has essentially the same volumetric capacity for cooking stews, soups and the like as does the vessel 15 of the cooker 12.

It is also noted that the portion of the side walls 13a of the crockery vessel 13 terminate in an annular shelf 13f which serves to support the cover 17. Thus, as a consequence of the outward angled portion 13d, the mouths of the vessels 13 and 15 are essentially of the same dimensions so that a single cover 17 may be used in connection with either one of the vessels.

The air space 25 as well as the insulating character of the heavy crockery vessel 13 provide an insulating barrier between the heating element 18 with its associated vessel 15 and the contents of the crockery vessel 13. As a consequence of this insulating barrier, the fluctuating heat at any particular setting of the thermostat 22 is leveled out so that as the heat is actually delivered to the contents of the crockery vessel 13, a substantially constant temperature condition is obtained. This provides an arrangement whereby very effective slow cooking can be achieved. The thermostat may be adjusted so that the temperature of the crockery vessel 13 is slightly below the boiling temperature whereby the food may be slow cooked without having any boiling resulting in the food even though the cycling of the thermostat results in a fluctuation of temperture in the areas of the heater 18 and the cooking vessel 15. The adjustable thermostat allows the temperature of the crockery vessel 13 to be varied according to the food load contained therein.

The crockery vessel 13 may be easily inserted or removed from the electric cooker 12, adapting the cooker to slow cooking when desired or permitting it to be used for more conventional higher temperature cooking tasks. In addition, when the crockery vessel 13 is removed from the electric cooker 12, it may be immersed for cleaning in deep water or placed in a dishwasher without any concern for the heating element or thermostat which is associated with it during operation. Further, the crockery vessel 13 may be used to prepare foods in a conventional oven. Although the portion of the crockery vessel 13 positioned above the flange 15c is not enclosed by the primary cooking vessel 15 as is the remainder of the vessel 13, there is still sufficient heat transfer to the contents of the vessel 13 so that even and uniform cooking is obtained. In the relatively rare situation in which the vessel 13 is filled above the angled portion 13d, the normal convection and conduction through the food serves to maintain the relatively thin upper layer of the food at substantially the same temperature as the portion below it, particularly in view of the insulating effect of the thickened wall of the crockery vessel 13 in the area above the flange 15c. This particular configuration of the ceramic vessel 13 shown in the drawings allows the crockery vessel 13 to be of the same volumetric capacity as the primary vessel 15 and also to make use of the same cover 17 in closing the mouth thereof.

The electric cooker 12 is conventionally provided with a housing 26 having cylindrical side walls 27 and a cup-shaped bottom member 28 to form an enclosure around the primary cooking vessel 15. The cord 19 extends into the housing 26 through a conventional strain relief 29 into connection with the thermostat 20 and the heating element 18. The housing 26 is supported by means of downwardly extending posts 30 which are brazed or otherwise secured to the bottm 15b of the primary vessel 15. The vessel flange 15c overlaps the upper edges of the housing's side walls 27. On the outer surface of the housing 26 there are provided handles 32 which may be used in transporting the appliance 11. In addition, there are supporting feet 33 mounted on the bottom of the housing 26 to support the appliance 11 in spaced relationship to the supporting surface.

In the molding and firing of a crockery, ceramic or glass vessel such as 13, it is difficult, if not impossible, to hold close tolerances. As a consequence, it is difficult to associate such a vessel with a metallic support or housing without encountering problems in fitting the parts together. In the instant design, the only area of engagement between the secondary vessel 13 and the primary vessel 15 is along the shoulder 13e where it engages the flange 15c. The space between the walls and bottom of the secondary vessel 13 and the opposed walls of the primary vessel 15 are such as to readily accommodate the expected tolerances in the secondary vessel 13. Another advantage associated with the spacing of the secondary vessel and the primary vessel is the fact that a non-stick coating may be used in connection with the inner surface of the primary vessel without concern for its being scratched or damaged by the secondary vessel.

It has been found that a crockery vessel having a wall thickness of on the order of in excess of 0.25 inches in thickness for the side walls 13a and the bottom 13b provides a structurally sound and suitable insulation to perform the functions outlined above. The primary vessel 15, on the other hand, is on the order of 0.040 inches in thickness providing sufficient thermal conductivity to give reasonably uniform temperature of the walls adjacent the air space 25.

While there has been shown and described a particular embodiment of the present invention, it will be apparent to those skilled in the art that various changes and modifications may be made without departing from the invention in it broader aspects, and it is, therefore, contemplated in the appended claims to cover all such changes and modifications as fall within the true spirit and scope of the present invention.

What is claimed as new and desired to be secured by Letters Patent of the United States is:

1. A multiple purpose cooking appliance comprising a primary cooking vessel formed of material having high thermal conductivity, said vessel having a bottom wall and side walls defining a mouth, an electric heating element mounted in good conducting relationship with said vessel, thermostatic control means connected in circuit with said heating element and mounted to respond to the temperature of said vessel to cyclicly energize said heating element producing a fluctuating temperature in said vessel, means for selectively controlling said thermostatic control means to establish the temperature at which said thermostatic control means fluctuates, said primary vessel with its associated heating element and thermostatic control means being adapted to perform cooking and roasting functions at temperatures in excess of 200°F., a removable ceramic vessel having a bottom and side walls defining a mouth, said ceramic vessel having a peripheral shoulder on said side walls spaced downwardly from said mouth thereof, said shoulder being formed to engage the uppermost edge of said side walls defining said mouth of said primary cooking vessel to center said ceramic vessel with respect to said primary cooking vessel and support said vessels with their side walls and bottom walls in spaced relation forming an air space therebetween to produce a thermal lag between said heating element and the contents of said ceramic vessel, said ceramic vessel extending above said side walls of said primary vessel facilitating removal of said ceramic vessel from said primary vessel, said appliance with said ceramic vessel supported within said primary vessel being adapted to cook foods at a low temperature on the order of 190°–200°F. for substantial periods of time without undesirable bacteria growth in the foods cooked therein, means on said primary vessel for supporting said appliance on a supporting surface, and an outer housing secured to said primary vessel and forming an enclosure for said primary vessel and said heating element.

2. The appliance of claim 1, wherein said ceramic vessel extends upwardly from said peripheral shoulder to such an extent that the volumetric capacity of said ceramic vessel is substantially equal to the capacity of said primary cooking vessel.

3. The appliance of claim 1 wherein each of said vessels is formed at its mouth with an annular shoulder for supporting a cover to close said mouth, either of said shoulders being adapted to support said cover.

4. The combination of claim 1 wherein said primary cooking vessel is formed of an aluminum alloy and said ceramic vessel is formed of ceramic material having a wall thickness substantially greater than the wall thickness of said primary cooking vessel.

5. The combination of claim 1 wherein said primary vessel is formed of an aluminum alloy, said heating element being a sheathed heating element secured to the bottom of said primary vessel, said thermostatic control means being mounted on said primary vessel, said primary vessel having a cylindrical wall with a flange at the top thereof supporting said ceramic vessel, said primary vessel being spaced from said ceramic vessel exept for the engagement between said flange and said ceramic vessel.

6. The combination of claim 1 wherein said primary cooking vessel is on the order of 0.040 inches in thickness and said ceramic cooking vessel is in excess of 0.25 inches in thickness, said thermostatic control means cycling over a range of at least 25°F.

7. A multiple purpose cooking appliance comprising a primary cooking vessel formed of drawn aluminum and having high thermal conductivity, said vessel having a bottom wall and side walls defining a mouth, a sheathed electric heating element mounted in good conducting relationship with said vessel, thermostatic control means connected in circuit with said heating element and mounted to respond to the temperature of said vessel to cyclicly energize said heating element producing a fluctuating temperature in said vessel, means for selectively controlling said thermostatic control means to establish the temperature at which said thermostatic control means fluctuates, said primary vesssel with its associated heating element and thermostatic control means being adapted to perform cooking and roasting functions at temperatures in excess of 200°F., a removable second vessel being formed of a material from the group of ceramic and glass and having a bottom and side walls defining a mouth, said second vessel having a wall thickness of on the order of in excess of 0.25 inches, said second vessel having a peripheral shoulder on said side walls spaced downwardly from said mouth thereof, said shoulder being formed to engage the uppermost edge of said side walls defining said mouth of said primary cooking vessel to center said second vessel with respect to said primary cooking vessel and support said vessels with their side walls and bottom walls in spaced relation forming an air space therebetween to produce a thermal lag between said heating element and the contents of said second vessel, said air space being in excess of one-eighth inch, said second vessel extending above said side walls of said primary vessel facilitating removal of said second vessel from said primary vessel, said appliance with said second vessel supported within said primary vessel being adapted to cook foods at a low temperature on the order of 190°–200°F. for substantial periods of time without undesirable bacteria growth in the foods cooked therein, and means on said primary vessel for supporting said appliance on a supporting surface.

8. The multiple purpose cooking appliance of claim 7 wherein said second vessel is formed with an inwardly angled wall portion extending downwardly from said shoulder engaging said primary vessel to center said second vessel with respect to said primary vessel and provide a uniform air space between the walls of said vessels.

9. The multiple purpose cooking appliance of claim 7 wherein the walls of said vessels define mouth openings of substantially the same size to accommodate a single vessel cover alternatively in either of said vessels for closing said mouth openings.

* * * * *

UNITED STATES PATENT OFFICE
CERTIFICATE OF CORRECTION

Patent No. 3,908,111         Dated September 23, 1975

Inventor(s) Jean-Pierre Du Bois and Ralph Charles Stern

It is certified that error appears in the above-identified patent and that said Letters Patent are hereby corrected as shown below:

Column 2, line 52 - "presesnt" should be --present--;

Column 2, line 59 - after "it's," "wall" should be --walls--;

Column 4, line 31 - after 20 "in" should be --is--;

Column 4, line 49 - after upper "edge" should be --edges--;

Column 7, line 22 - after "1" comma should be deleted;

Signed and Sealed this ninth Day of March 1976

[SEAL]

Attest:

RUTH C. MASON
*Attesting Officer*

C. MARSHALL DANN
*Commissioner of Patents and Trademarks*